US010992363B2

(12) United States Patent
Yang et al.

(10) Patent No.: US 10,992,363 B2
(45) Date of Patent: Apr. 27, 2021

(54) METHOD, TERMINAL DEVICE AND NETWORK DEVICE FOR TRANSMITTING SIGNAL

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/238,435

(22) Filed: Jan. 2, 2019

(65) Prior Publication Data

US 2019/0149217 A1 May 16, 2019

Related U.S. Application Data

(63) Continuation of application No. PCT/CN2016/100944, filed on Sep. 29, 2016.

(51) Int. Cl.
*H04B 7/06* (2006.01)
*H04L 1/18* (2006.01)
(Continued)

(52) U.S. Cl.
CPC ......... *H04B 7/0695* (2013.01); *H04B 7/0617* (2013.01); *H04B 7/088* (2013.01);
(Continued)

(58) Field of Classification Search
CPC ... H04B 7/0695; H04B 7/0617; H04L 1/1861; H04L 5/0005; H04W 76/27; H04W 72/046; H04W 16/28
See application file for complete search history.

(56) References Cited

U.S. PATENT DOCUMENTS

2003/0169749 A1 9/2003 Huang et al.
2013/0045690 A1 2/2013 Seol et al.
(Continued)

FOREIGN PATENT DOCUMENTS

CN 102724682 A 10/2012
CN 102916735 A 2/2013
(Continued)

OTHER PUBLICATIONS

ASUSTeK Beam management in NR 3GPP TSG-RAN WG2 Meeting #95 R2-165287 Goteborg, Sweden, Aug. 22-26, 2016.*
(Continued)

*Primary Examiner* — Yemane Mesfin
*Assistant Examiner* — Henry Baron
(74) *Attorney, Agent, or Firm* — Ladas & Parry, LLP

(57) ABSTRACT

Embodiments of the present application provide a method, a terminal device and a network device for transmitting a signal. The method includes: transmitting, by a terminal device, a first signal using multiple beams, where the first signal is configured for a network device to determine a target beam among the multiple beams; receiving, by the terminal device, a notification message transmitted by the network device, where the notification message is configured to notify the terminal device of the target beam determined by the network device; and transmitting, by the terminal device, a second signal using the target beam. In the embodiments of the present application, the terminal device transmits the first signal using the multiple beams, so that the network device determines for the terminal device the beam with a better forming gain for transmitting the second signal, thereby improving the quality of the signal transmission.

11 Claims, 8 Drawing Sheets

(51) Int. Cl.
  *H04L 5/00*   (2006.01)
  *H04W 72/04*  (2009.01)
  *H04W 16/28*  (2009.01)
  *H04W 76/27*  (2018.01)
  *H04B 7/08*   (2006.01)

(52) U.S. Cl.
  CPC .......... *H04L 1/1861* (2013.01); *H04L 5/0005* (2013.01); *H04W 16/28* (2013.01); *H04W 72/046* (2013.01); *H04W 76/27* (2018.02)

(56) References Cited

U.S. PATENT DOCUMENTS

| | | |
|---|---|---|
| 2013/0258885 A1 | 10/2013 | Yu et al. |
| 2014/0023035 A1 | 1/2014 | Zou et al. |
| 2014/0226558 A1 | 8/2014 | Speight et al. |
| 2017/0251460 A1* | 8/2017 | Agiwal ............. H04W 72/0406 |
| 2017/0339670 A1* | 11/2017 | Chae ................. H04W 72/0446 |

FOREIGN PATENT DOCUMENTS

| | | |
|---|---|---|
| CN | 103716081 A | 4/2014 |
| CN | 103782524 A | 5/2014 |
| CN | 104734759 A | 6/2015 |
| CN | 104796185 A | 7/2015 |
| WO | 2016086144 A1 | 6/2016 |

OTHER PUBLICATIONS

"Beam management in NR", R2-165287, 3GPP TSG-RAN WG2, Goteborg, Sweden, Aug. 22-26, 2016.
Extended European Search Report from EP app. No. 16917223.6, dated May 8, 2019.
From PCT/CN2016/100944, Interntaional Search Report, dated Jun. 28, 2017, with machine English translation from WIPO.
From PCT/CN2016/100944, Written Opinion of the International Searching Authority, dated Jun. 28, 2017 with machine English translation from Google Translate.
The second Office Action of corresponding Chinese application No. 201680086829.5, dated Sep. 23, 2020.
The third Office Action of corresponding Chinese application No. 201680086829.5, dated Dec. 2, 2020.
The first Office Action of corresponding Japanese application No. 2018-567867, dated Nov. 13, 2020.
The First Office Action of corresponding Chinese application No. 201680086829.5, dated Jun. 30, 2020.
The First Office Action of corresponding Indian application No. 201817048883, dated Jul. 14, 2020.
The First Office Action of corresponding European application No. 16917223.6, dated Aug. 31, 2020.
The first Office Action of corresponding Taiwan application No. 106129613, dated Jan. 29, 2021.
The Notice of Rejection of corresponding Chinese application No. 2016800868295, dated Mar. 1, 2021.

* cited by examiner

METHOD, TERMINAL DEVICE AND NETWORK DEVICE FOR TRANSMITTING SIGNAL

CROSS-REFERENCE TO RELATED APPLICATION

This application is a continuation of International Application No. PCT/CN2016/100944, filed on Sep. 29, 2016, the disclosure of which is hereby incorporated by reference in its entirety.

TECHNICAL FIELD

The present application relates to the field of communication and, in particular, to a method, a terminal device and a network device for transmitting a signal.

BACKGROUND

Multi-antenna (Multiple-Input multiple-Output, MIMO) technology is one of the core technologies in Long Term Evolution (LTE) system, and can greatly increase the transmission rate of the system. Beamforming, which is a signal preprocessing technology based on an antenna array, creates a beam with directivity by adjusting weights for signals transmitted on individual antenna array elements.

In the prior art, a terminal device often arbitrarily selects a beam for signal transmission. This cannot ensure that the terminal device can always select the beam with a better forming gain, thus failing to guarantee the quality of the signal transmission.

SUMMARY

In view of the above, embodiments of the present disclosure provide a method, a network device, and a terminal device for transmitting a signal to enable the terminal device to transmit the signal using a beam with a better forming gain, thereby improving the quality of signal transmission.

A first aspect provides a method for transmitting a signal, including: transmitting, by a terminal device, a first signal using multiple beams, where the first signal is configured for a network device to determine a target beam among the multiple beams; receiving, by the terminal device, a notification message transmitted by the network device, where the notification message is configured to notify the terminal device of the target beam determined by the network device; and transmitting, by the terminal device, a second signal using the target beam.

The terminal device uses the multiple beams to transmit the first signal configured for the network device to determine the target beam, receives the notification message, which is transmitted by the network device, configured to notify the terminal device of the target beam that has been determined, and uses the target beam to transmit the second signal. Thus, the terminal device transmits the first signal using the multiple beams, so that the network device determines for the terminal device the target beam with a better forming gain for transmitting the second signal, thereby improving the quality of the signal transmission.

In some possible implementations, the method further includes: transmitting, by the terminal device, first indicating information to the network device, where the first indicating information is configured to indicate a number N of beams that can be supported by the terminal device, where N is a positive integer greater than or equal to 2; receiving, by the terminal device, second indicating information transmitted by the network device, where the second indicating information carries beam identities IDs configured for the N beams by the network device; where the transmitting, by the terminal device, the first signal using the multiple beams includes: transmitting, by the terminal device, the first signal using the N beams according to the beam IDs.

The terminal device transmits a maximum value of a number of the beams that can be supported to the network device, and transmits the first signal according to the beam corresponding to the beam IDs configured by the network device, thereby improving beam utilization.

In some possible implementations, the second indicating information further carries a mapping relationship between the beam IDs and time-frequency resources, where the transmitting, by the terminal device, the first signal using the N beams according to the beam IDs includes: transmitting, by the terminal device, the first signal using the N beams according to the beam IDs and the mapping relationship between the beam IDs and the time-frequency resources.

The terminal device may transmit the first signal to the network device according to the time-frequency resources indicated by the network device, reducing the interference that might have been imposed on beam measurement when a congested time-frequency resource is occupied.

In some possible implementations, the first signal carries beam IDs of the beams, where the receiving, by the terminal device, the notification message transmitted by the network device includes: receiving, by the terminal device, the notification message, which is transmitted by the network device, carrying a beam ID of the target beam.

The terminal device configures each beam with the beam ID, enabling the network device to distinguish different beams according to the beam IDs, so as to determine the target beam.

In some possible implementations, the method further includes: acquiring, by the terminal device, a timing advance TA value, where the TA value is configured to indicate a delay between the terminal device and the network device, where the transmitting, by the terminal device, the first signal using the multiple beams includes: transmitting, by the terminal device, the first signal using the multiple beams according to the TA value.

By transmitting the signal according to the TA value, the terminal device can further improve the quality of the signal transmission between the terminal device and the network device.

A second aspect provides a method for transmitting a signal, including: receiving, by a network device, a first signal transmitted by a terminal device using multiple beams; determining, by the network device, a target beam among the multiple beams according to the first signal; transmitting, by the network device, a notification message to the terminal device, where the notification message is configured to notify the terminal device of the target beam that has been determined by the network device.

The network device receives the first signal transmitted by the terminal device using the multiple beams, determines the target beam according to the first signal, and transmits the notification message to the terminal device to inform the terminal device of the target beam that has been determined, so that the terminal device transmits the second signal using the target beam. Thus, the network device determines the target beam with a better forming gain according to the first signal transmitted by the terminal device using the multiple beams, and the terminal device transmits the second signal according to the target beam, thereby improving the quality of the signal transmission.

In some possible implementations, before the receiving, by the network device, the first signal transmitted by the terminal device using the multiple beams, the method further includes: acquiring, by the network device, first indicating information transmitted by the terminal device, where the first indicating information is configured to indicate a number N of beams that can be supported by the terminal device, where N is a positive integer greater than or equal to 2; configuring, by the network device, each of the N beams with a beam identity ID according to the first indicating information; and transmitting, by the network device, second indicating information to the terminal device, where the second indicating information carries beam IDs of the N beams.

The network device receives a maximum value of a number of the beams that can be supported by the terminal device transmitted by the terminal device and configures the beam IDs, so that the terminal device transmits the first signal according to the beam corresponding to the beam ID, thereby improving beam utilization.

In some possible implementations, the method further includes: determining, by the network device, a mapping relationship between the beam IDs and time-frequency resources, where the transmitting, by the network device, the second indicating information to the terminal device includes: transmitting, by the network device, the second indicating information to the terminal device, where the second indicating information further carries the mapping relationship between the beam IDs and the time-frequency resources.

The network device determines the mapping relationship between the beam IDs and the time-frequency resources, and notifies the terminal device of the mapping relationship, so that the terminal device may transmit the first signal to the network device according to the time-frequency resources indicated by the network device, reducing the interference that might have been imposed on beam measurement when a congested time-frequency resource is occupied.

In some possible implementations, the first signal carries beam IDs of the beams, where the determining, by the network device, the target beam among the multiple beams according to the first signal includes: determining, by the network device, a beam ID of the target beam among the beam IDs of the multiple beams according to the first signal, where the transmitting, by the network device, the notification message to the terminal device includes: transmitting, by the network device, the notification message carrying the beam ID of the target beam to the terminal device.

The network device can distinguish different beams according to the beam IDs configured by the terminal device for each beam, so as to determine the target beam.

In some possible implementations, the method further includes: transmitting, by the network device, a TA value to the terminal device, where the TA value is configured to indicate a delay between the terminal device and the network device.

The network device transmits the TA value to the terminal device, so that the terminal device may transmit the signal according to the TA value, further improving the quality of the signal transmission between the terminal device and the network device.

A third aspect provides a method for transmitting a signal, including: transmitting, by a terminal device, first indicating information to a network device, where the first indicating information is configured to indicate a number N of a beam that can be supported by the terminal device, where N is a positive integer greater than or equal to 1; receiving, by the terminal device, second indicating information transmitted by the network device, where the second indicating information carries a beam identity ID configured by the network device for the N beam; transmitting, by the terminal device, a first signal using the N beam according to the second indicating information.

By reporting to the network device the number N of the beam that can be supported by the terminal device to cause the network device to configure the N beam with the beam ID and transmit the second indicating information that carries the beam ID to the terminal device to cause the terminal device to transmit the first signal to the network device according to the beam ID, the terminal device transmits the signal according to an indication of the network device using the number of the beam that can be supported by the network device, thereby improving beam utilization.

In some possible implementations, the second indicating information further carries a mapping relationship between the beam ID and a time-frequency resource.

In some possible implementations, the method further includes: acquiring, by the terminal device, a timing advance TA value, where the TA value is configured to indicate a delay between the terminal device and the network device, where the transmitting, by the terminal device, the first signal using the N beam includes: transmitting, by the terminal device, the first signal using the N beam according to the TA value.

A fourth aspect provides a method for transmitting a signal, including: receiving, by a network device, first indicating information transmitted by a terminal device, where the first indicating information is configured to indicate a number N of a beam that can be supported by the terminal device, where N is a positive integer greater than or equal to 1; configuring, by the network device, each of the N beam with a beam identity ID; and transmitting, by the network device, second indicating information to the terminal device, where the second indicating information carries the beam ID.

By receiving from the terminal device a report about the number N of the beam that can be supported, configuring the N beam with the beam ID and transmitting the first indicating information carrying the beam ID to the terminal device, the terminal device transmits the first signal to the network device according to the beam ID. Thus, the terminal device transmits the signal according to an indication of the network device using the number of the beam that can be supported by the network device, thereby improving beam utilization.

In some possible implementations, the method further includes: determining, by the network device, a mapping relationship between the beam ID and a time-frequency resource, where the transmitting, by the network device, the second indicating information to the terminal device includes: transmitting, by the network device, the second indicating information to the terminal device, where the second indicating information carries the mapping relationship between the beam ID and the time-frequency resource.

In some possible implementations, the method further includes: transmitting, by the network device, a TA value to the terminal device, where the TA value is configured to indicate a delay between the terminal device and the network device.

A fifth aspect provides a terminal device, including various modules for executing the method in the first aspect or any of the possible implementations of the first aspect.

A sixth aspect provides a network device, including various modules for executing the method in the second aspect or any of the possible implementations of the second aspect.

A seventh aspect provides a terminal device, including various modules for executing the method in the third aspect or any of the possible implementations of the third aspect.

An eighth aspect provides a network device, including various modules for executing the method in the fourth aspect or any of the possible implementations of the fourth aspect.

A ninth aspect provides a communication system, including: the terminal device according to the aforementioned fifth aspect and the network device according to the aforementioned sixth aspect.

A tenth aspect provides a communication system, including: the terminal device according to the aforementioned seventh aspect and the network device according to the aforementioned eighth aspect.

An eleventh aspect provides a terminal device, including: a processor and a memory, where the memory stores a program, and the processor executes the program for executing the method for transmitting the signal according to the aforementioned first aspect or any of the possible implementations of the first aspect.

A twelfth aspect provides a network device, including: a processor and a memory, where the memory stores a program, and the processor executes the program for executing the method for transmitting the signal according to the aforementioned second aspect or any of the possible implementations of the second aspect.

A thirteenth aspect provides a terminal device, including: a processor and a memory, where the memory stores a program, and the processor executes the program for executing the method for transmitting the signal according to the aforementioned third aspect or any of the possible implementations of the third aspect.

A fourteenth aspect provides a network device, including: a processor and a memory, where the memory stores a program, and the processor executes the program for executing the method for transmitting the signal according to the aforementioned fourth aspect or any of the possible implementations of the fourth aspect.

A fifteenth aspect provides a computer storage medium, storing program code which is configured to instruct the execution of the method for transmitting the signal according to the aforementioned first aspect or any of the possible implementations of the first aspect.

A sixteenth aspect provides a computer storage medium, storing program code which is configured to instruct the execution of the method for transmitting the signal according to the aforementioned second aspect or any of the possible implementations of the second aspect.

A seventeenth aspect provides a computer storage medium, storing program code which is configured to instruct the execution of the method for transmitting the signal according to the aforementioned third aspect or any of the possible implementations of the third aspect.

An eighteenth aspect provides a computer storage medium, storing program code which is configured to instruct the execution of the method for transmitting the signal according to the aforementioned fourth aspect or any of the possible implementations of the fourth aspect.

According to the foregoing technical solutions, the terminal device uses the multiple beams to transmit the first signal; the network device determines the target beam among the multiple beams according to the first signal, and transmits to the network device the notification message which notifies the terminal device of the target beam that has been determined, and the terminal device uses the target beam to transmit the second signal. Thus, the terminal device transmits the first signal using multiple beams, so that the network device determines for the terminal device the target beam with a better forming gain for transmitting the second signal, thereby improving the quality of the signal transmission.

BRIEF DESCRIPTION OF THE DRAWINGS

A brief introduction will be given hereinafter to the accompany drawings which will be used in the description of embodiments of the present application or the prior art in order to explain the technical solutions of the present application more clearly. Apparently, the drawings in the description below are merely some embodiments of the present application. Those of ordinary skill in the art may derive other drawings according to these drawings without paying any creative labor.

DETAILED DESCRIPTION

Figure 1:
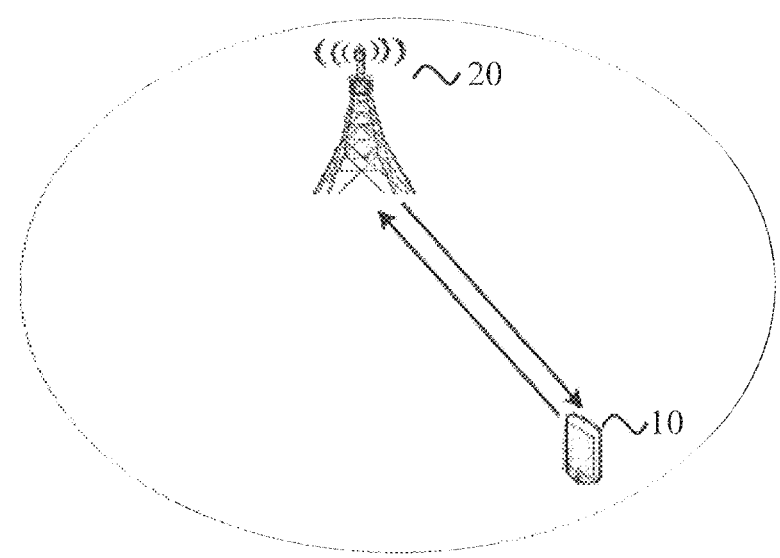
FIG. 1 is an application scenario diagram according to embodiments of the present application.

Now the technical solutions in the embodiments of the present application will be described hereunder clearly and comprehensively with reference to the accompanying drawings. Obviously, the described embodiments are some, rather than all, embodiments of the present application. Based on the embodiment of the present application, all the other embodiments obtained by those of ordinary skill in the art without paying any creative labor shall belong to the scope of the present application.

It should be understood that the technical solution of the embodiment of the present disclosure may be applied to various communication systems, such as a global system of mobile communication (Global System of Mobile, "GSM" for short) system, a code division multiple access (Code Division Multiple Access, CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) System, an LTE frequency division duplex (LTE Frequency Division Duplex, "FDD" for short) system, an LTE time division duplex (LTE Time Division Duplex, "TDD" for short), a universal mobile telecommunication system (Universal Mobile Telecommunication System, "UMTS" for short), a worldwide interoperability for microwave access (Global Interoperability for Microwave Access, "WiMAX" for short) communication system or a $5^{th}$ generation ($5^{th}$ Generation, 5G) system in the further.

In particular, the technical solutions of the embodiments of the present disclosure may be applied to various communication systems based on non-orthogonal multiple access technologies, such as sparse code multiple access (Sparse Code Multiple Access, "SCMA" for short) system, low density signature (Low Density Signature "LDS" for short) system, or the like. Of course, the SCMA system and the LDS system may also be known in other names in the field of communication. Further, the technical solution of the embodiments of the present disclosure may be applied to multi-carrier transmission system which adopts non-orthogonal multiple access technology, e.g., orthogonal frequency division multiplexing (Orthogonal Frequency Division Multiplexing "OFDM" for short), filter bank multi-carrier (Filter Bank Multi-Carrier "FBMC" for short), generalized frequency division multiplexing (Generalized Frequency Division Multiplexing "GFDM" for short), and filtered-OFDM (Filtered-OFDM "F-OFDM" for short) system.

As used in the embodiment of the present disclosure, the terminal device may also be referred to as a user equipment (User Equipment, UE), an access terminal, a subscriber unit, a subscriber station, a mobile table, a mobile station, a far transmitted station, a remote terminal, a mobile device, and a user terminal, a terminal, a wireless communication device, a user agent or a subscriber apparatus. The access terminal may be a cellular phone, a cordless phone, a session initiation protocol (Session Initiation Protocol, SIP) phone, a wireless local loop (Wireless Local Loop, WLL) station, or a personal digital assistant (Personal Digital Assistant, PDA), or a handheld device with wireless communication capabilities, computing device or other processing device connected to a wireless modem, a vehicle-mounted device, a wearable device, a terminal device in a future 5G network, or a terminal device in a future evolved public land mobile communication network (Public Land Mobile Communication Network, PLMN), or the like, which is not be limited in the embodiments of the present disclosure.

As used in the embodiment of the present disclosure, the network device may be a device communicating with the terminal device, and could be a base transceiver station (Base Transceiver Station, BTS) in GSM or CDMA, or a base station (NodeB, NB) in WCDMA system, or an evolved base station (Evolutional NodeB, eNB or eNodeB) in LTE system, or a wireless controller in cloud radio access network (Cloud Radio Access Network, CRAN) scenario. Alternatively, the network device may be a relay station, an access point, a vehicle-mounted device, a wearable device, and a network device in the future 5G network or a network device in the future evolved PLMN network, or the like, which is not be limited in the embodiments of the present disclosure.

FIG. 1 is a schematic diagram illustrating an application scenario of the present disclosure. The communication system in FIG. 1 may include a terminal device 10 and a network device 20. The network device 20 is configured to provide the terminal device 10 with a communication service and access a core network. The terminal device 10 accesses the network by searching for synchronization signals, broadcast signals or the like transmitted by the network device 20, so as to implement communication with the network. An arrow shown in FIG. 1 may represent uplink/downlink transmission via a cellular link between the terminal device 10 and the network device 20.

In a 5G system, it is necessary to support data transmission in a high frequency band (a center frequency is above 6 GHz, typically 28 GHz for instance) to achieve a requirement in terms of a transmission rate by 5G. In the case of data transmission in the high frequency band, it is required to adopt multi-antenna technology to achieve a higher transmission rate.

In the prior art, the terminal device often arbitrarily selects a beam for signal transmission. This cannot ensure that the terminal device can always select the beam with a better forming gain, thus failing to guarantee the quality of the signal transmission.

Figure 2:
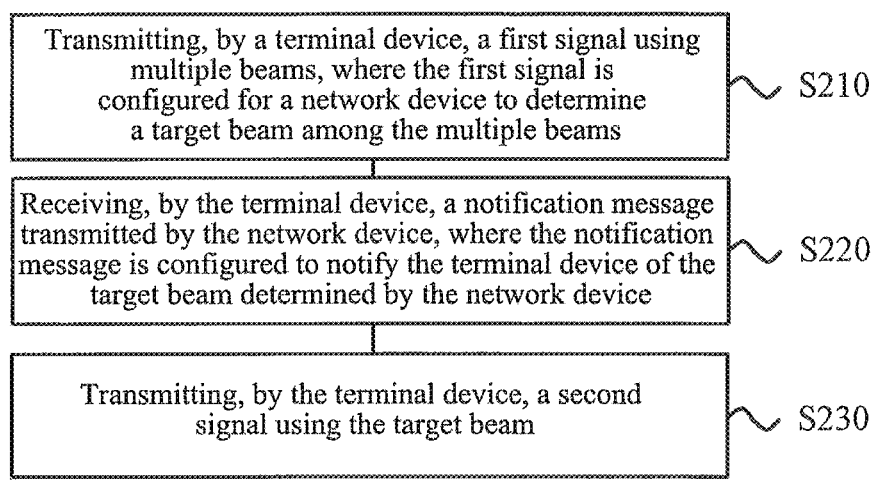
FIG. 2 is a schematic diagram of a method for transmitting a signal according to an embodiment of the present application.

FIG. 2 shows a schematic diagram of a method 200 for transmitting a signal according to an embodiment of the present application. The executive subject of the method 200 may be a terminal device. The method 200 includes:

S210: transmitting, by the terminal device, a first signal using multiple beams, where the first signal is configured for a network device to determine a target beam among the multiple beams;

S220: receiving, by the terminal device, a notification message transmitted by the network device, where the notification message is configured to notify the terminal device of the target beam determined by the network device;

S230: transmitting, by the terminal device, a second signal using the target beam.

Specifically, the terminal device transmits multiple first signals using the multiple beams to a base station, so that the base station can determine the target beam with a best forming gain according to the received multiple first signals, and transmit the notification message to the terminal device to inform the terminal device of the target beam that has been selected. Thus, the terminal device may transmit other signals (represented as the second signal) using the target beam, thereby ensuring the quality of the signal transmission.

In the embodiment of the present application, the first signal is an uplink signal, which may be any one of a demodulation reference signal (Demodulation Reference Signal, DMRS), a physical uplink control channel (Physical Uplink Control Channel, PUCCH), and a sounding reference signal (Sounding Reference Signal, SRS). The first signal and the second signal may be the same or different, which is not limited in the present application.

The notification message may be a radio resource control (Radio Resource Control, RRC) message, a downlink control information (Downlink Control Information, DCI) signaling or a handover command, which is not limited in the present application.

It should be understood that the terminal device transmit the first signal using the multiple beams simultaneously or periodically, which is not limited in the present application.

It should also be understood that the different beams may be regarded as beams in different beam directions or the same beam direction. For convenience of description, the embodiments of the present application will be described by taking an example in which different beams represent different beam directions.

Therefore, in the method for transmitting the signal in the embodiment of the present application, the terminal device uses the multiple beams to transmit the first signal configured for the network device to determine the target beam, receives the notification message, which is transmitted by the network device, configured to notify the terminal device of the target beam that has been determined, and uses the target beam to transmit the second signal. Thus, the terminal device transmits the signal using multiple beams, so that the network device determines for the terminal device the beam with a better forming gain for transmitting the signal, thereby improving the quality of the signal transmission.

In an embodiment, the first signal carries beam identities (Identities, IDs) of the beams, where the receiving, by the terminal device, the notification message transmitted by the network device includes: receiving, by the terminal device, the notification message, which is transmitted by the network device, carrying a beam ID of the target beam.

Specifically, the terminal device may identify each beam, and carry in the first signal the beam IDs of the beams used for transmitting the first signal, so that the network device may, after determining the target beam among the multiple beams transmitted by the terminal device and when returning the notification message to the terminal device, cause the notification message to carry the beam ID of the target beam therein. Thus, the terminal device can identify the target beam according to the beam ID of the target beam, so that the target beam can be used to transmit the signal, thereby ensuring the quality of the signal transmission.

It should be noted that, in the embodiment of the present application, the terminal device may also cause the first signal to carry other feature information of the beams therein, so that the terminal device and the network device may distinguish different beams according to the feature information, thereby determining the target beam. This feature information is not limited in the present application.

In an embodiment, the method may further include: transmitting, by the terminal device, first indicating information to the network device, where the first indicating information is configured to indicate a number N of beams that can be supported by the terminal device, where N is a positive integer greater than or equal to 2; receiving, by the terminal device, second indicating information transmitted by the network device, where the second indicating information carries the beam IDs configured for the N beams by the network device; where the transmitting, by the terminal device, the first signal using the multiple beams includes: transmitting, by the terminal device, the first signal using the N beams according to the beam IDs.

Specifically, the terminal device determines a maximum number of beams that it can support, and the number of beams may depend on the number of antennas. The terminal device transmits the maximum number N of beams that it can support to the network device, where N is certainly greater than or equal to 2. Thus, the network device configures the N beams with the beam IDs, and transmits the beam IDs configured for the N beams to the terminal device through the second indicating information. The terminal device informs the network device of a maximum value of the number of the beams that can be supported, the network device configures each beam with a time-frequency resource, and the terminal device uses the beams corresponding to the beam IDs to transmit the first signal. Thus, the terminal device can fully utilize all the beams to transmit the first signal, thereby improving beam utilization.

It should be understood that the network device may make a pre-agreement with the terminal device regarding the time-frequency resources corresponding to the beam IDs. Thus, after the network device notifies of the beam ID for transmitting the first signal, the terminal device can determine the corresponding time-frequency resources according to the beam IDs, which is not limited in the present application.

In an embodiment, the second indicating information further carries a mapping relationship between the beam IDs and the time-frequency resources, where the transmitting, by the terminal device, the first signal using the N beams according to the beam IDs includes: transmitting, by the terminal device, the first signal using the N beams according to the beam IDs and the mapping relationship between the beam IDs and the time-frequency resources.

Specifically, the second indicating information received by the terminal device may further carry the mapping relationship between the beam IDs and the time-frequency resources, where the mapping relationship between the beam IDs and the time-frequency resources is configured by the network device for each beam ID, so that the terminal device may transmit the first signal to the network device using the beams associated with the beam IDs and the time-frequency resources associated with the beam IDs. That is, the terminal device may transmit the first signal to the network device according to the time-frequency resources indicated by the network device, reducing the interference that might have been imposed on beam measurement when a same time-frequency resource occupied by other devices is occupied.

It should be understood that the time-frequency resource corresponding to different beam IDs may be the same or different. For example, the terminal device may transmit signals of different beams by polling the time-frequency resources.

In an embodiment, the method further includes: acquiring, by the terminal device, a timing advance TA value, where the TA value is configured to indicate a delay between the terminal device and the network device, where the transmitting, by the terminal device, the first signal using the multiple beams includes: transmitting, by the terminal device, the first signal using the multiple beams according to the TA value.

Specifically, there will be a delay for the signal transmissions between the terminal device and the network device, especially when the terminal device moves over a long distance within a coverage range of the network device to which it belongs, or even moves to a coverage range of other network devices. In these cases, the terminal device may acquire the timing advance TA value, according to which an advance time for transmitting the signal may be determined. Specifically, the advance time for the terminal device to transmit the signal may be slightly more than the TA value or less, depending on the need, thereby further improving the quality of the signal transmission between the terminal device and the network device.

When the terminal device moves from the network device, which it currently belongs to (referred to as "first network device"), to another network device (referred to as "second network device"), the terminal device receives a handover command transmitted by the first network device, and performs a handover according to the handover command. When the terminal device is in the coverage of the first network device, the first network device determines the target beam for the terminal device. When the terminal device moves into the coverage of the second network device, the second network device determines the target beam for the terminal device. Thus, when the terminal device moves into the coverage of the second network device, the second network device determines the target beam and configures network resources for the terminal device, and informs the first network device. The first network device forwards the target beam and a configuration of the network resource through the handover command to the terminal device. The terminal device transmits the second signal to the second network device using the target beam.

Therefore, in the method for transmitting the signal in the embodiment of the present application, the terminal device uses the multiple beams to transmit the first signal configured for the network device to determine the target beam, receives the notification message, which is transmitted by the network device, configured to notify the terminal device of the target beam that has been determined, and uses the target beam to transmit the second signal. Thus, the terminal device transmits the signal using the multiple beams, so that the network device determines for the terminal device the beam with a better forming gain for transmitting the signal, thereby improving the quality of the signal transmission.

Figure 3:
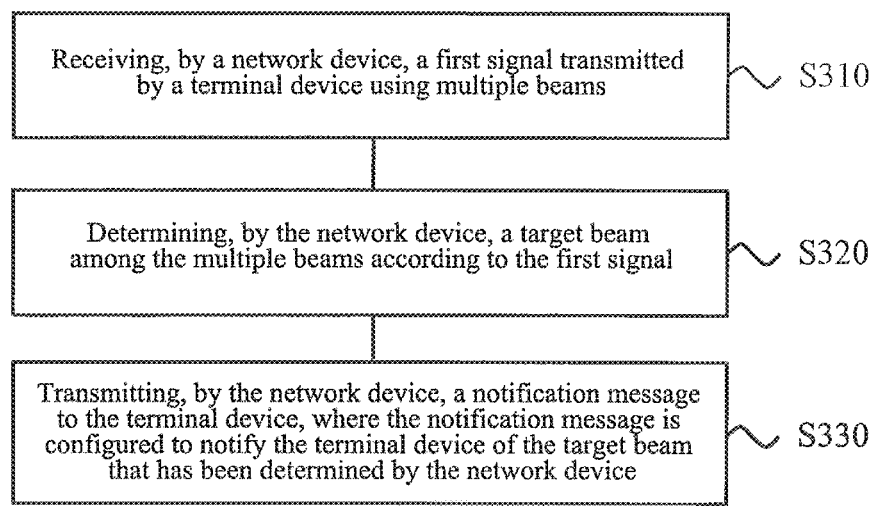
FIG. 3 is a schematic diagram of a method for transmitting a signal according to another embodiment of the present application.

FIG. 3 is a schematic diagram of a method 300 for transmitting a signal according to an embodiment of the present application. The executive subject of the method 300 may be a network device. The method 300 includes:

S310: receiving, by the network device, a first signal transmitted by the terminal device using multiple beams;

S320: determining, by the network device, a target beam among the multiple beams according to the first signal;

S330: transmitting, by the network device, a notification message to the terminal device, where the notification message is configured to notify the terminal device of the target beam that has been determined by the network device.

Specifically, the network device receives multiple first signals transmitted by the terminal device using the multiple beams, and may determine the target beam among the multiple beams based on a signal quality of the multiple first signals, and then inform the terminal device of the target beam that has been determined through the notification message, so that the terminal device may use the target beam to transmit a subsequent signal, thereby ensuring the quality of the signal transmission.

It should be understood that the number of first signals received by the network device may be less than the number of signals transmitted by the terminal device. That is, the signal quality of the first signal transmitted through some of the beams might be too poor, so that it can not be detected by the network device.

It should be understood that, in the embodiment of the present disclosure, the interactions and related features, functions, or the like described on the terminal device side correspond to that in the descriptions on the network device side, and will not be repeated herein for brevity.

Therefore, in the method for transmitting the signal in the embodiment of the present application, the network device receives the first signal transmitted by the terminal device using the multiple beams, determines the target beam according to the first signal, and transmits the notification message to the terminal device to inform the terminal device of the target beam that has been determined, so that the terminal device transmits a second signal using the target beam. Thus, the network device determines the target beam with a better forming gain according to the first signal transmitted by the terminal device using the multiple beams, and the terminal device transmits the second signal according to the target beam, thereby improving the quality of the signal transmission.

In an embodiment, before the receiving, by the network device, the first signal transmitted by the terminal device using the multiple beams, the method further includes: acquiring, by the network device, first indicating information transmitted by the terminal device, where the first indicating information is configured to indicate a number N of beams that can be supported by the terminal device, where N is a positive integer greater than or equal to 2; configuring, by the network device, each of the N beams with a beam identity ID according to the first indicating information; and transmitting, by the network device, second indicating information to the terminal device, where the second indicating information carries beam IDs of the N beams.

Specifically, the network device receives a maximum value of a number (denoted as N) of the beams that can be supported, which may either be actively reported by the terminal device, or acquired by transmitting a request message by the network device. The network device configures the N beams with the beam IDs, and notify to the terminal device through the second indicating information.

In an embodiment, the method further includes: determining, by the network device, a mapping relationship between the beam IDs and time-frequency resources, where the transmitting, by the network device, the second indicating information to the terminal device includes: transmitting, by the network device, the second indicating information to the terminal device, where the second indicating information further carries the mapping relationship between the beam IDs and the time-frequency resources.

Specifically, the network device configures each beam in the maximum value N of the number of the beams that can be supported by the terminal device with the beam ID. The network device configures, based on an occupancy of the time-frequency resources, each beam with a corresponding time-frequency resource, which is also carried in the second indicating information and notified to the terminal device. The network device allocates an idle time-frequency resource to the terminal, thereby improving the efficiency of the signal transmission.

For example, the network device learns that the maximum value of the number of the beams that can be supported by the terminal device is four, and then configures beam IDs for the four beams: ID1, ID2, ID3, and ID4. The network device determines the mapping relationship between each of the beam IDs and the time-frequency resource: ID1 corresponds to time-frequency resource 1, ID2 corresponds to time-frequency resource 2, ID3 corresponds to time-frequency resource 3, and ID4 corresponds to time-frequency resource 4. Thus, after the network device transmits the second indicating information, which carries the mapping relationship between the beam IDs and the time-frequency resources, to the terminal device, the terminal device may transmit the first signal according to the time-frequency resources corresponding to each of the beam IDs.

In an embodiment, the first signal carries beam IDs of the beams, where the determining, by the network device, the target beam among the multiple beams according to the first signal includes: determining, by the network device, a beam ID of the target beam among the beam IDs of the multiple beams according to the first signal, where the transmitting, by the network device, the notification message to the terminal device includes: transmitting, by the network device, the notification message carrying the beam ID of the target beam to the terminal device.

Specifically, the network device receives the first signal carrying the beam IDs transmitted by the terminal device, determines the target beam according to the first signal, and causes the notification message to carry the beam ID of the target beam, so that the terminal device can identify the target beam and transmit the second signal through the target beam.

In an embodiment, the method further includes: transmitting, by the network device, a TA value to the terminal device, where the TA value is configured to indicate a delay between the terminal device and the network device.

The terminal device may obtain the timing advance TA value, and determine an advance time for transmitting the signal according to the TA value, thereby further improving the quality of the signal transmission between the terminal device and the network device.

Therefore, in the method for transmitting the signal in the embodiment of the present application, the network device receives the first signal transmitted by the terminal device using the multiple beams, determines the target beam according to the first signal, and transmits the notification message to the terminal device to inform the terminal device of the target beam that has been determined, so that the terminal device transmits the second signal using the target beam. Thus, the network device determines the target beam with a better forming gain according to the first signal transmitted by the terminal device using the multiple beams, and the terminal device transmits the second signal according to the target beam, thereby improving the quality of the signal transmission.

Figure 4:
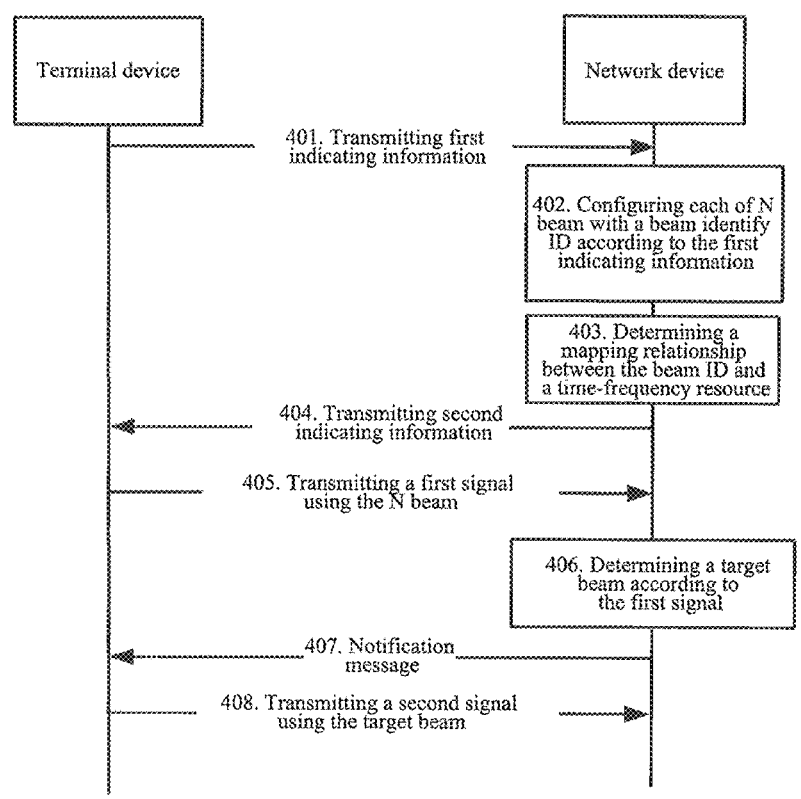
FIG. 4 is a schematic flowchart of a method for transmitting a signal according to an embodiment of the present application.

Now, an embodiment of the present application will be detailed with reference to FIG. 4. The meanings of the various terms in this embodiment are the same as those in the foregoing embodiments.

It should be noted that this practice is only intended to help those of ordinary skill in the art to better understand the embodiments of the present application, rather than to limit the scope of the embodiments of the present application.

401: transmitting, by a terminal device, first indicating information to a network device, where the first indicating information is configured to indicate a maximum value N of a number of a beam that can be supported by the terminal device.

402: configuring, by the network device, the N beam with a beam ID.

403: determining, by the network device, a mapping relationship between the beam ID and a time-frequency resource.

404: transmitting, by the network device, a second indicating information to the terminal device, where the second indicating information carries the mapping relationship between the beam ID and the time-frequency resource.

405: transmitting, by the terminal device, a first signal to the network device using each of the N beam according to the time-frequency resource corresponding to the beam ID.

406: determining, by the network device, a target beam among the N beam according to the first signal.

407: transmitting, by the network device, a notification message to the terminal device, where the notification message is configured to notify the terminal device of the determined target beam.

408: transmitting, by the terminal device, a second signal to the network device using the target beam.

Therefore, in the method for transmitting the signal in the embodiment of the present application, the terminal device transmits the number N of the beam that can be supported to the network device. The network device configures the N beam with the beam ID, and determines the mapping relationships between the beam ID and the time-frequency resource, and transmits the first indicating information to the terminal device to inform the terminal device. The network device transmits the first signal according to the time-frequency resource corresponding to the beam ID, determines the target beam according to the first signal, and transmits the notification message to the terminal device to inform the terminal device of the target beam that has been determined. The terminal device transmits the second signal using the target beam. Thus, the network device determines the target beam with a better forming gain according to the first signal transmitted by the terminal device using multiple beams, and the terminal device transmits the second signal according to the target beam, thereby improving the quality of the signal transmission.

It should be understood that, in various embodiments of the present application, the sequence numbers of the above processes do not imply an execution order. The execution order of the processes should be determined by their functions and internal logic, but is not intended to limit an implementation in the embodiments of the present application.

In the prior art, the terminal device often arbitrarily selects a beam for signal transmission. Instead, the embodiment of the present application proposes a new method for transmitting a signal.

Figure 5:
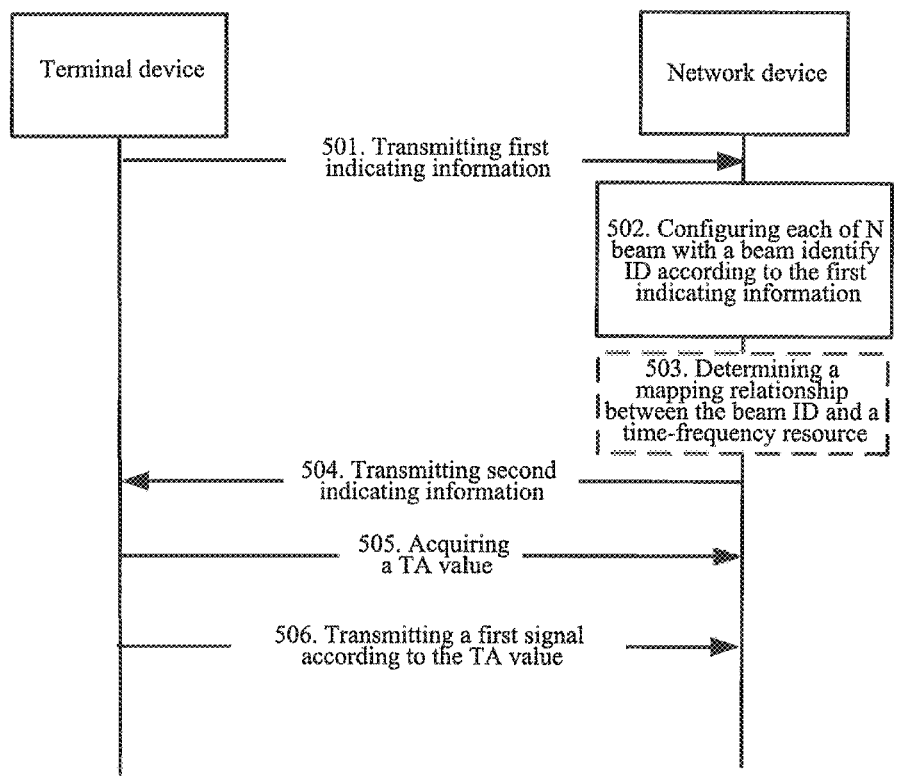
FIG. 5 is a schematic flowchart of a method for transmitting a signal according to another embodiment of the present application.

FIG. 5 illustrates another embodiment of the present application. The meanings of the various terms in this embodiment are the same as those in the foregoing embodiments.

It should be noted that this practice is only intended to help those of ordinary skill in the art to better understand the embodiments of the present application, rather than to limit the scope of the embodiments of the present application.

501: transmitting, by a terminal device, first indicating information to a network device, where the first indicating information is configured to indicate a maximum value N of a number of a beam that can be supported by the terminal device, where N≥1.

502: configuring, by the network device, the N beam with a beam ID.

503: determining, by the network device, a mapping relationship between the beam ID and a time-frequency resource.

Step 503 do not have to be executed. Rather, the terminal device may make a pre-agreement with the network device regarding the time-frequency resource corresponding to different beam IDs, so that the network device may transmit the first signal according to the beam ID.

504: transmitting, by the network device, a second indicating information to the terminal device, where the second indicating information carries the beam IDs and the mapping relationship between the beam ID and the time-frequency resource.

If step 503 is not executed, the second indicating information in step 504 would carry the beam ID.

505: acquiring, by the terminal device, a TA value.

506: transmitting, by the terminal device, a first signal to the network device according to the TA value.

The terminal device acquires the TA value and transmits the first signal according to the TA value, thereby improving the quality of the signal transmission.

Therefore, in the method for transmitting the signal in the embodiment of the present application, by reporting the number N of the beam that can be supported by the terminal device to the network device to cause the network device to configure the N beam with the beam ID and transmitting the first indicating information carrying the beam ID to the terminal device to cause the terminal device to transmit the first signal to the network device according to the beam ID, the terminal device may transmit the signal according to an indication of the network device using the number of the beam that can be supported by the terminal device, thereby improving beam utilization.

The method for transmitting the signal according to the embodiment of the present application has been detailed above, and now a network device and a terminal device according to the embodiment of the present application will be described in the following.

Figure 6:
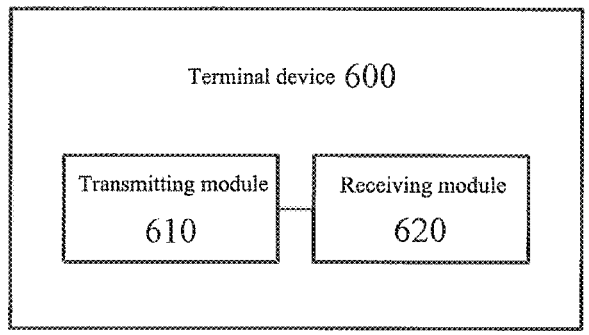
FIG. 6 is a schematic block diagram of a terminal device according to embodiments of the present application.

FIG. 6 shows a schematic block diagram of a terminal device 600 according to an embodiment of the present application. As shown in FIG. 6, the terminal device 600 includes:

a transmitting module 610, configured to transmit a first signal using multiple beams, where the first signal is configured for a network device to determine a target beam among the multiple beams;

a receiving module 620, configured to receive a notification message transmitted by the network device, where the notification message is configured to notify the terminal device of the target beam determined by the network device; and the transmitting module 610 is further configured to transmit a second signal using the target beam.

In an embodiment, the transmitting module 610 is further configured to transmit first indicating information to the network device, where the first indicating information is configured to indicate a number N of beams that can be supported by the terminal device, where N is a positive integer greater than or equal to 2; the receiving module 620 is further configured to receive second indicating information transmitted by the network device, where the second indicating information carries beam identities IDs configured for the N beams by the network device; the transmitting module 610 is specifically configured to: transmit the first signal using the N beams according to the beam IDs.

In an embodiment, the second indicating information further carries a mapping relationship between the beam IDs and time-frequency resources, the transmitting module 610 is specifically configured to: transmit the first signal using the N beams according to the beam IDs and the mapping relationship between the beam IDs and the time-frequency resources.

In an embodiment, the first signal carries beam IDs of the beams, the receiving module 620 is specifically configured to: receive the notification message, which is transmitted by the network device, carrying a beam ID of the target beam.

In an embodiment, the receiving module 620 is further configured to acquire a timing advance TA value, where the TA value is configured to indicate a delay between the terminal device and the network device, the transmitting module is specifically configured to: transmit the first signal using the multiple beams according to the TA value.

Therefore, the terminal device in the embodiment of the present application uses the multiple beams to transmit the first signal configured for the network device to determine the target beam, receives the notification message, which is transmitted by the network device, configured to notify the terminal device of the target beam that has been determined, and uses the target beam to transmit the second signal. Thus, the terminal device transmits the signal using the multiple beams, so that the network device determines for the terminal device the beam with a better forming gain for transmitting the signal, thereby improving the quality of the signal transmission.

Figure 7:
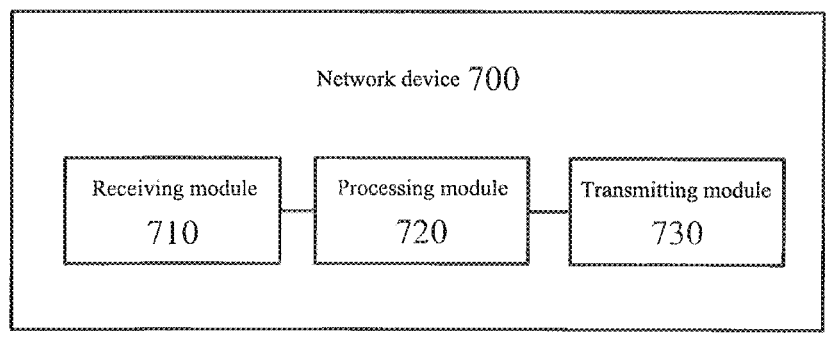
FIG. 7 is a schematic block diagram of a network device according to an embodiment of the present application.

FIG. 7 shows a schematic block diagram of a network device 700 according to an embodiment of the present application. As shown in FIG. 7, the network device 700 includes:

a receiving module 710, configured to receive a first signal transmitted by a terminal device using multiple beams;

a processing module 720, configured to determine a target beam among the multiple beams according to the first signal received by the receiving module;

a transmitting module 730, configured to transmit a notification message to the terminal device, where the notification message is configured to notify the terminal device of the target beam that has been determined by the network device.

In an embodiment, before the network device receives the first signal transmitted by the terminal device using the multiple beams, the receiving module 710 is configured to acquire first indicating information transmitted by the terminal device, where the first indicating information is configured to indicate a number N of beams that can be supported by the terminal device, where N is a positive integer greater than or equal to 2; the processing module 720 is further configured to configure each of the N beams with a beam identity ID according to the first indicating information; and the transmitting module 730 is further configured to transmit second indicating information to the terminal device, where the second indicating information carries beam IDs of the N beams.

In an embodiment, the processing module 720 is further configured to determine a mapping relationship between the beam IDs and a time-frequency resource, the transmitting module 730 is specifically configured to: transmit the second indicating information to the terminal device, where the second indicating information carries the mapping relationship between the beam ID and the time-frequency resource.

In an embodiment, the first signal carries beam IDs of the beams, the processing module 720 is specifically configured to: determine a beam ID of the target beam among the beam IDs of the multiple beams according to the first signal; the transmitting module 730 is specifically configured to: transmit the notification message carrying the beam ID of the target beam to the terminal device.

In an embodiment, the transmitting module 730 is further configured to transmit a TA value to the terminal device, where the TA value is configured to indicate a delay between the terminal device and the network device.

The network device in the embodiment of the present application receives the first signal transmitted by the terminal device using the multiple beams, determines the target beam according to the first signal, and transmits the notification message to the terminal device to inform the terminal device of the target beam that has been determined, so that the terminal device transmits a second signal using the target beam. Thus, the network device determines the target beam with a better forming gain according to the first signal transmitted by the terminal device using the multiple beams, and the terminal device transmits the second signal according to the target beam, thereby improving the quality of the signal transmission.

Figure 8:
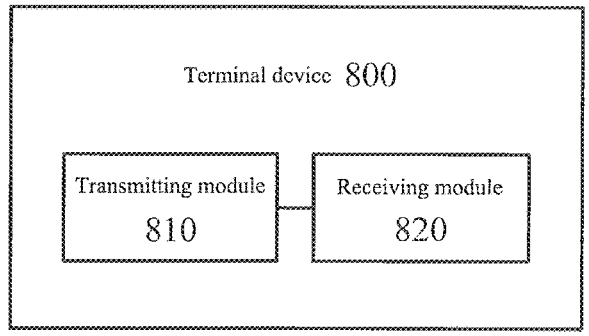
FIG. 8 is a schematic block diagram of a terminal device according to an embodiment of the present application.

FIG. 8 shows a schematic block diagram of a terminal device 800 according to an embodiment of the present application. As shown in FIG. 8, the terminal device 800 includes:

a transmitting module 810, configured to transmit first indicating information to a network device, where the first indicating information is configured to indicate a number N of a beam that can be supported by the terminal device, where N is a positive integer greater than or equal to 1;

a receiving module 820, configured to receive second indicating information transmitted by the network device, where the second indicating information carries a beam identity ID configured by the network device for the N beam;

the transmitting module 810 is further configured to transmit a first signal using the N beam according to the second indicating information.

In an embodiment, the second indicating information further carries a mapping relationship between the beam ID and a time-frequency resource.

In an embodiment, the receiving module 820 is further configured to acquire a timing advance TA value, where the TA value is configured to indicate a delay between the terminal device and the network device, the transmitting module 810 is specifically configured to: transmit the first signal using the N beam according to the TA value.

Therefore, the terminal device in the embodiment of the present application reports to the network device the number N of the beam that can be supported by the terminal device to cause the network device to configure the N beam with the beam ID and transmit the second indicating information that carries the beam ID to the terminal device to cause the terminal device to transmit the first signal to the network device according to the beam ID. Thus, the terminal device transmits the signal according to an indication of the network device using the number of the beam that can be supported by the network device, thereby improving beam utilization.

Figure 9:
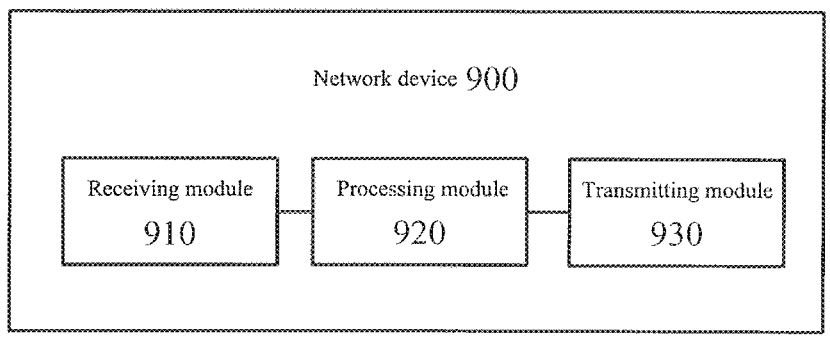
FIG. 9 is a schematic block diagram of a network device according to an embodiment of the present application.

FIG. 9 shows a schematic block diagram of a network device 900 according to an embodiment of the present application. As shown in FIG. 9, the network device 900 includes:

a receiving module 910, configured to receive first indicating information transmitted by a terminal device, where the first indicating information is configured to indicate a number N of a beam that can be supported by the terminal device, where N is a positive integer greater than or equal to 1;

a processing module 920, configured to configure each of the N beam with a beam identity ID; and a transmitting module 930, configured to transmit second indicating information to the terminal device, where the second indicating information carries the beam ID.

In an embodiment, the processing module 920 is further configured to determine a mapping relationship between the beam ID and a time-frequency resource, the transmitting module 930 is specifically configured to: transmit the second indicating information to the terminal device, where the second indicating information carries the mapping relationship between the beam ID and the time-frequency resource.

In an embodiment, the transmitting module 930 is further configured to transmit a TA value to the terminal device, where the TA value is configured to indicate a delay between the terminal device and the network device.

Therefore, the network device in the embodiment of the present application receives from the terminal device a report about the number N of the beam that can be supported, configures the N beam with the beam ID and transmits the first indicating information carrying the beam ID to the terminal device to cause the terminal device to transmit the first signal to the network device according to the beam ID. Thus, the terminal device transmits the signal according to an indication of the network device using the number of the beam that can be supported by the network device, thereby improving beam utilization.

Figure 10:
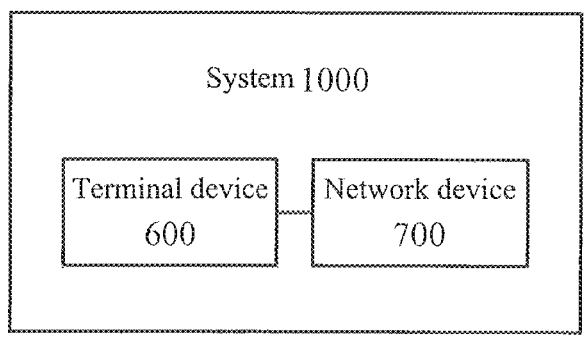
FIG. 10 is a schematic block diagram of a system for transmitting a signal according to an embodiment of the present application.

FIG. 10 shows a schematic block diagram of a system 1000 for transmitting a signal provided by an embodiment of the present application. The system 1000 includes:

the terminal device 600 according to the aforementioned embodiment of the present application and the network device 700 according to the aforementioned embodiment of the present application.

Figure 11:
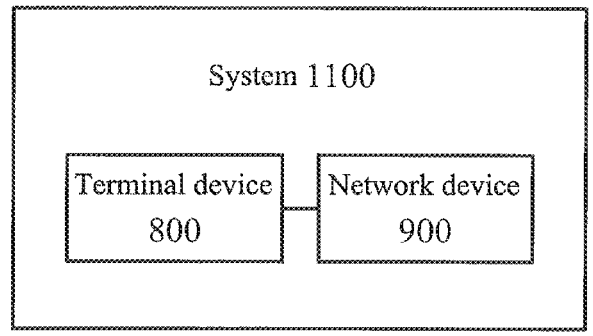
FIG. 11 is a schematic block diagram of a system for transmitting a signal according to another embodiment of the present application.

FIG. 11 shows a schematic block diagram of a system 1100 for transmitting a signal provided by an embodiment of the present application. The system 1100 includes:

the terminal device 800 according to the aforementioned embodiment of the present application and the network device 900 according to the aforementioned embodiment of the present application.

Figure 12:
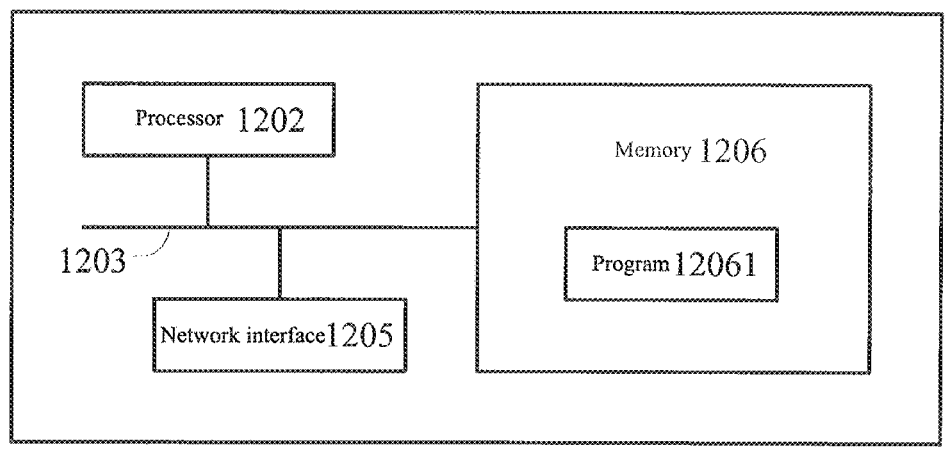
FIG. 12 is a schematic structural diagram of a terminal device according to an embodiment of the present application.

FIG. 12 shows a structure of a terminal device provided by an embodiment of the present application, including at least one processor 1202, for example, a general-purpose processor CPU, a digital signal processor (DSP), an application-specific integrated circuit (ASIC), a field programmable gate array (FPGA), or the like, having computing and processing capabilities, where the processor manages and schedules modules and elements in the terminal device. Also included are at least one network interface 1205 or other communication interfaces, a memory 1206, and at least one bus system 1203. Various components in the terminal device are coupled together through the bus system 1203 which may include a data bus, a power bus, a control bus, a status signal bus, or the like. Yet, various types of buses are annotated as the bus system 1203 for clarity in the description.

The methods disclosed in the above embodiments of the present application may be applied to the processor 1202, or be used for executing an executable module, such as a computer program, which is stored in the memory 1206. The memory 1206 may include a high speed random access memory (RAM: Random Access Memory), and may also include an instability memory (non-volatile memory). The memory may include a read only memory and a random access memory, and provides the processor with needed signaling or data, programs, or the like. A portion of the memory may also include non-volatile random access memory (NVRAM). A communication connection with at least another network element may be achieved through the at least one network interface 1205, which may be wired or wireless.

In some embodiments, the memory 1206 stores a program 12061, and the processor 1202 executes the program 12061 for executing the following operations:

transmitting, through the network interface 1205, a first signal using multiple beams, where the first signal is configured for a network device to determine a target beam among the multiple beams;

receiving, through the network interface 1205, a notification message transmitted by the network device, where the notification message is configured to notify the terminal device of the target beam determined by the network device; and transmitting, through the network interface 1205, a second signal using the target beam.

It should be noted that the terminal device may specifically be the terminal device in the foregoing embodiments, and may be configured to perform various steps and/or processes corresponding to the terminal device in the foregoing method embodiments.

It can be seen from the foregoing technical solution provided by the embodiment of the present application that, by using the multiple beams to transmit the first signal configured for the network device to determine the target beam, receiving the notification message, which is transmitted by the network device, configured to notify the terminal device of the target beam that has been determined, and using the target beam to transmit the second signal, the terminal device transmits the signal using the multiple beams, so that the network device determines for the terminal device the beam with a better forming gain for transmitting the signal, thereby improving the quality of the signal transmission.

Figure 13:
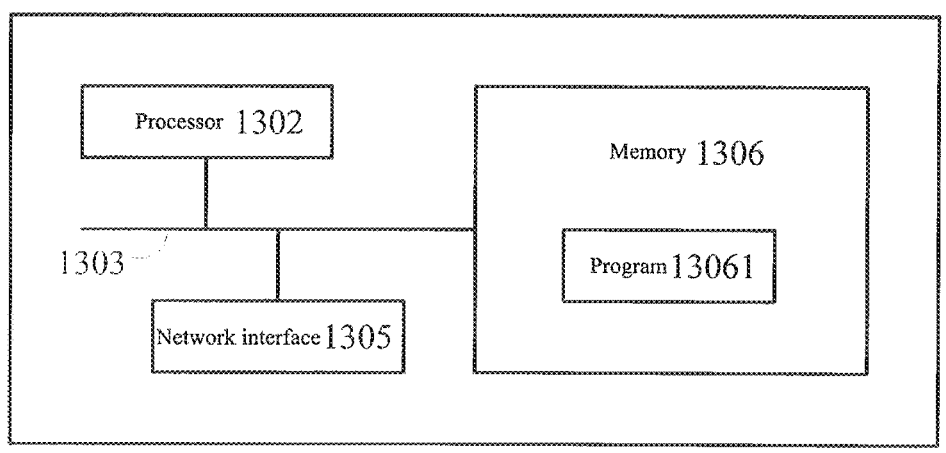
FIG. 13 is a schematic structural diagram of a network device according to an embodiment of the present application.

FIG. 13 shows a structure of a network device provided by an embodiment of the present application, including at least one processor 1302, for example, a general-purpose processor CPU, a digital signal processor (DSP), an application-specific integrated circuit (ASIC), a field programmable gate array (FPGA), or the like, having computing and processing capabilities, where the processor manages and schedules modules and elements in the network device. Also included are at least one network interface 1305 or other communication interfaces, a memory 1306, and at least one bus system 1303. Various components in the network device are coupled together through the bus system 1303 which may include a data bus, a power bus, a control bus, a status signal bus, or the like. Yet, various types of buses are annotated as the bus system 1303 for clarity in the description.

The methods disclosed in the above embodiments of the present application may be applied to the processor 1302, or be used for executing an executable module, such as a computer program, which is stored in the memory 1306. The memory 1306 may include a high speed random access memory (RAM: Random Access Memory), and may also include an instability memory (non-volatile memory). The memory may include a read only memory and a random access memory, and provides the processor with needed signaling or data, programs, or the like. A portion of the memory may also include non-volatile random access memory (NVRAM). A communication connection with at least another network element may be achieved through the at least one network interface 1305, which may be wired or wireless.

In some embodiments, the memory 1306 stores a program 13061, and the processor 1302 executes the program 13061 for executing the following operations:

receiving, through network interface 1305, a first signal transmitted by a terminal device using multiple beams; determining, by the network device, a target beam among the multiple beams according to the first signal;

transmitting, through the network interface 1305, a notification message to the terminal device, where the notification message is configured to notify the terminal device of the target beam that has been determined by the network device.

It should be noted that the network device may specifically be the network device in the foregoing embodiments, and may be configured to perform various steps and/or processes corresponding to the network device in the foregoing method embodiments.

It can be seen from the foregoing technical solution provided by the embodiment of the present application that, by receiving the first signal transmitted by the terminal device using the multiple beams, determining the target beam according to the first signal, and transmitting the notification message to the terminal device to inform the terminal device of the target beam that has been determined so as to cause the terminal device to transmit the second signal using the target beam, the network device determines the target beam with a better forming gain according to the first signal transmitted by the terminal device using the multiple beams for transmitting the second signal, thereby improving the quality of the signal transmission.

Figure 14:
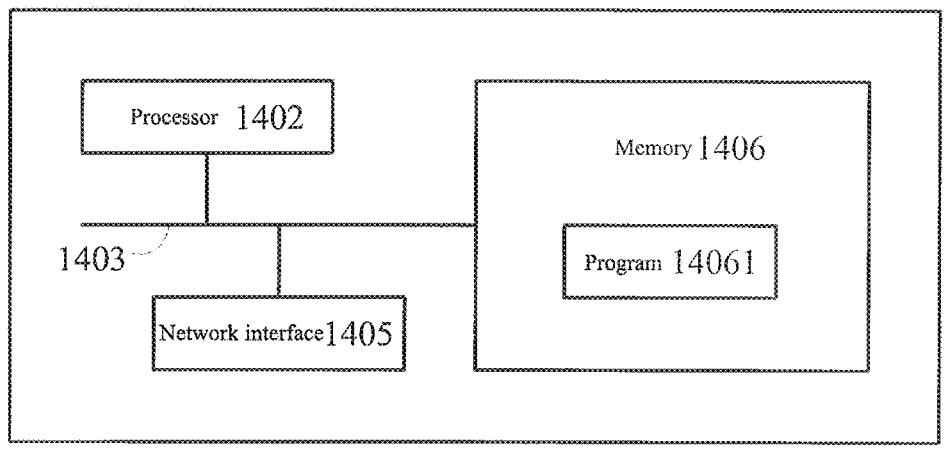
FIG. 14 is a schematic structural diagram of a terminal device according to an embodiment of the present application.

FIG. 14 shows a structure of a terminal device provided by an embodiment of the present application, including at least one processor 1402, for example, a general-purpose processor CPU, a digital signal processor (DSP), an application-specific integrated circuit (ASIC), a field programmable gate array (FPGA), or the like, having computing and processing capabilities, where the processor manages and schedules modules and devices in the terminal device. Also included are at least one network interface 1405 or other communication interfaces, a memory 1406, and at least one bus system 1403. Various components in the terminal device are coupled together through the bus system 1403 which may include a data bus, a power bus, a control bus, a status signal bus, or the like. Yet, various types of buses are annotated as the bus system 1403 for clarity in the description.

The methods disclosed in the above embodiments of the present application may be applied to the processor 1402, or be used for executing an executable module, such as a computer program, which is stored in the memory 1406. The memory 1406 may include a high speed random access memory (RAM: Random Access Memory), and may also include an instability memory (non-volatile memory). The memory may include a read only memory and a random access memory, and provides the processor with needed signaling or data, programs, or the like. A portion of the memory may also include non-volatile random access memory (NVRAM). A communication connection with at least another network element may be achieved through the at least one network interface 1405, which may be wired or wireless.

In some embodiments, the memory 1406 stores a program 14061, and the processor 1402 executes the program 14061 for executing the following operations:

transmitting, through the network interface 1405, first indicating information to a network device, where the first indicating information is configured to indicate a number N of a beam that can be supported by the terminal device, where N is a positive integer greater than or equal to 1;

receiving, through the network interface 1405, second indicating information transmitted by the network device, where the second indicating information carries a beam identity ID configured by the network device for the N beam;

transmitting, through the network interface 1405, a first signal using the N beam according to the second indicating information.

It should be noted that the terminal device may specifically be the terminal device in the foregoing embodiments, and may be configured to perform various steps and/or processes corresponding to the terminal device in the foregoing method embodiments.

It can be seen from the foregoing technical solution provided by the embodiment of the present application that, by reporting to the network device the number N of the beam that can be supported by the terminal device to cause the network device to configure the N beam with the beam ID and transmit the second indicating information that carries the beam ID to the terminal device to cause the terminal device to transmit the first signal to the network device according to the beam ID, the terminal device transmits the signal according to an indication of the network device using the number of the beam that can be supported by the network device, thereby improving beam utilization.

Figure 15:
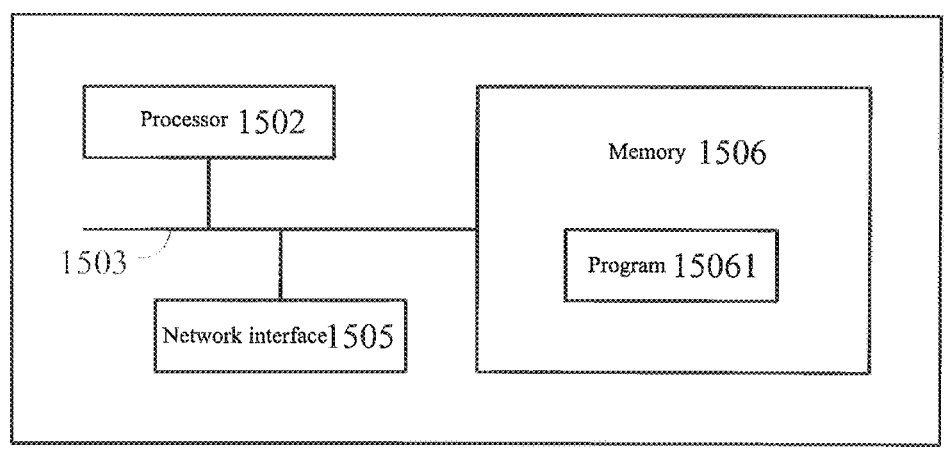
FIG. 15 is a schematic structural diagram of a network device according to an embodiment of the present application.

FIG. 15 shows a structure of a network device provided by an embodiment of the present application, including at least one processor 1502, for example, a general-purpose processor CPU, a digital signal processor (DSP), an application-specific integrated circuit (ASIC), a field programmable gate array (FPGA), or the like, having computing and processing capabilities, where the processor manages and schedules modules and devices in the network device. Also included are at least one network interface 1505 or other communication interfaces, a memory 1506, and at least one bus system 1503. Various components in the network device are coupled together through the bus system 1503 which may include a data bus, a power bus, a control bus, a status signal bus, or the like. Yet, various types of buses are annotated as the bus system 1503 for clarity in the description.

The methods disclosed in the above embodiments of the present application may be applied to the processor 1502, or be used for executing an executable module, such as a computer program, which is stored in the memory 1506. The memory 1506 may include a high speed random access memory (RAM: Random Access Memory), and may also include an instability memory (non-volatile memory). The memory may include a read only memory and a random access memory, and provides the processor with needed signaling or data, programs, or the like. A portion of the memory may also include non-volatile random access memory (NVRAM). A communication connection with at least another network element may be achieved through the at least one network interface 1505, which may be wired or wireless.

In some embodiments, the memory 1506 stores a program 15061, and the processor 1502 executes the program 15061 for executing the following operations:

receiving, through the network interface 1505, first indicating information transmitted by a terminal device, where the first indicating information is configured to indicate a number N of a beam that can be supported by the terminal device, where N is a positive integer greater than or equal to 1;

configuring, through the network interface 1505, each of the N beam with a beam identity ID; and transmitting, through the network interface 1505, second indicating information to the terminal device, where the second indicating information carries the beam ID.

It should be noted that the network device may specifically be the network device in the foregoing embodiments, and may be configured to perform various steps and/or processes corresponding to the network device in the foregoing method embodiments.

It can be seen from the foregoing technical solution provided by the embodiment of the present application that, by receiving from the terminal device a report about the number N of the beam that can be supported, configuring the N beam with the beam ID and transmitting the first indicating information carrying the beam ID to the terminal device, so as to cause the terminal device to transmit the first signal to the network device according to the beam ID, the terminal device transmits the signal according to an indication of the network device using the number of the beam that can be supported by the network device, thereby improving beam utilization.

An embodiment of the present application further provides a computer storage medium, which may store program instructions configured to instruct any of the above methods.

In an embodiment, the storage medium may be specifically the memory 1206, 1306, 1406 or 1506.

It should be understood that the term "and/or" herein is merely an association relationship describing associated objects, and indicates that there may be three relationships. For example, A and/or B may indicate: presence of A only, of both A and B and of B only. In addition, the character "/" herein generally indicates an "or" relationship between contextual objects.

It should be understood that, in various embodiments of the present application, the sequence numbers of the above processes do not imply an execution order. The execution order of the processes should be determined by their functions and internal logic, but is not intended to limit an implementation in the embodiments of the present application.

Those of ordinary skill in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those of ordinary skill in the art can clearly understand that, for convenience and brevity of the description, for specific operation processes of the systems, the apparatuses and the units described above, reference may be made to the corresponding processes in the above method embodiments, and details will not be repeated herein.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solutions of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or a network device, or the like) to perform all or part of the steps of the methods described in the embodiments of the present application. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present application, but the protection scope of the present application is not limited thereto. Any modification or the substitution conceived by persons skilled in the art within the technical scope of the present application should be covered in the protection scope of the present application. Therefore, the protection scope of the present application is subject to the protection scope of the appended claims.

The invention claimed is:

1. A method for transmitting a signal, comprising:
   transmitting, by a terminal device, first indicating information to a network device, wherein the first indicating information is configured to indicate a number N of beams that can be supported by the terminal device, wherein N is a positive integer greater than or equal to 2;
   receiving, by the terminal device, second indicating information transmitted by the network device, wherein the second indicating information carries beam identities (IDs) configured for the N beams by the network device;
   transmitting, by the terminal device, a first signal using the N beams, wherein the first signal is configured for the network device to determine a target beam among the N beams;
   receiving, by the terminal device, a notification message transmitted by the network device, wherein the notification message is configured to notify the terminal device of the target beam determined by the network device; and
   transmitting, by the terminal device, a second signal using the target beam;
   wherein the second indicating information further carries a mapping relationship between the beam IDs and time-frequency resources;
   wherein the transmitting, by the terminal device, the first signal using the N beams comprises:
   transmitting, by the terminal device, the first signal using the N beams according to the beam IDs and the mapping relationship between the beam IDs and the time-frequency resources.

2. The method according to claim 1, wherein the first signal carries beam IDs of the beams, and
   wherein the receiving, by the terminal device, the notification message transmitted by the network device comprises:
   receiving, by the terminal device, the notification message, which is transmitted by the network device, carrying a beam ID of the target beam.

3. The method according to claim 1, further comprising:
   acquiring, by the terminal device, a timing advance (TA) value, wherein the TA value is configured to indicate a delay between the terminal device and the network device,
   wherein the transmitting, by the terminal device, the first signal using the N beams comprises:
   transmitting, by the terminal device, the first signal using the N beams according to the TA value.

4. The method according to claim 1, further comprising:
   receiving, by the terminal device, a handover command transmitted by the network device, wherein the handover command is configured to notify the terminal device of the target beam determined by a second network device.

5. A method for transmitting a signal, comprising:
   transmitting, by a terminal device, first indicating information to a network device, wherein the first indicating information is configured to indicate a number N of a beam that can be supported by the terminal device, wherein N is a positive integer greater than or equal to 1;
   receiving, by the terminal device, second indicating information transmitted by the network device, wherein the second indicating information carries a beam identity (ID) configured by the network device for the N beam;
   transmitting, by the terminal device, a first signal using the N beam according to the second indicating information;
   wherein the second indicating information further carries a mapping relationship between the beam ID and a time-frequency resource;
   wherein the transmitting, by the terminal device, the first signal using the N beam according to the second indicating information comprises:
   transmitting, by the terminal device, the first signal using the N beam according to the beam ID and the mapping relationship between the beam ID and the time-frequency resource.

6. The method according to claim 5, further comprising:
   acquiring, by the terminal device, a timing advance (TA) value, wherein the TA value is configured to indicate a delay between the terminal device and the network device,
   wherein the transmitting, by the terminal device, the first signal using the N beam comprises:
   transmitting, by the terminal device, the first signal using the N beam according to the TA value.

7. A terminal device, comprising:
   a memory, a processor, and a computer program stored on the memory and operable on the processor,
   wherein the processor, when running the computer program, is configured to:
   transmit first indicating information to a network device, wherein the first indicating information is configured to indicate a number N of beams that can be supported by the terminal device, wherein N is a positive integer greater than or equal to 2;

receive second indicating information transmitted by the network device, wherein the second indicating information carries beam identities (IDs) configured for the N beams by the network device;

transmit a first signal using the N beams, wherein the first signal is configured for the network device to determine a target beam among the N beams;

receive a notification message transmitted by the network device, wherein the notification message is configured to notify the terminal device of the target beam determined by the network device; and transmit a second signal using the target beam;

wherein the second indicating information further carries a mapping relationship between the beam IDs and time-frequency resources;

wherein the processor is specifically configured to:

transmit the first signal using the N beams according to the beam IDs and the mapping relationship between the beam IDs and the time-frequency resources.

8. The terminal device according to claim 7, wherein the first signal carries beam IDs of the beams;

the processor is specifically configured to:

receive the notification message, which is transmitted by the network device, carrying a beam ID of the target beam.

9. The terminal device according to claim 7, wherein the processor is further configured to:

acquire a timing advance (TA) value, wherein the TA value is configured to indicate a delay between the terminal device and the network device;

the processor is specifically configured to:

transmit the first signal using the N beams according to the TA value.

10. The terminal device according to claim 7, wherein the processor is further configured to:

receive a handover command transmitted by the network device, wherein the handover command is configured to notify the terminal device of the target beam determined by a second network device.

11. The method according to claim 5, further comprising:

receiving, by the terminal device, a notification message transmitted by the network device, wherein the notification message is configured to notify the terminal device of a target beam determined by the network device among the N beam;

wherein the first signal carries the beam ID of the N beams, and wherein the receiving, by the terminal device, the notification message transmitted by the network device comprises:

receiving, by the terminal device, the notification message, which is transmitted by the network device, carrying a beam ID of the target beam.

* * * * *